Figure 1:
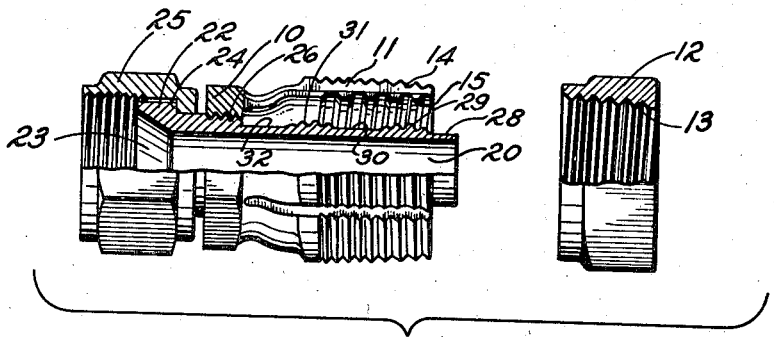

Aug. 10, 1948.　　　H. J. KNAGGS　　　2,446,599
HOSE INSERT
Filed Sept. 23, 1944

INVENTOR.
HAROLD J. KNAGGS
BY
Bosworth & Sessions
ATTORNEYS

Patented Aug. 10, 1948

2,446,599

UNITED STATES PATENT OFFICE 2,446,599

HOSE INSERT

Harold J. Knaggs, Cleveland, Ohio, assignor to The Weatherhead Company, Cleveland, Ohio, a corporation of Ohio Application September 23, 1944, Serial No. 555,454

3 Claims. (Cl. 285—84)

This invention relates to hose couplings or fittings, and the invention is disclosed herein in its application to high pressure hose couplings of the quick attachable re-usable type, i. e., hose couplings which can be attached to the ends of flexible hoses by means of hand tools in the field. It is to be understood, however, that the invention may be applied to hose couplings of different types such as those designed for permanent attachment to the ends of hoses by the use of special machines or tools.

Hose couplings of the quick attachable type generally comprise a body or shell adapted to receive the end of a hose and to grip the exterior of the hose end. A tubular part variously referred to in the art as a nipple, standpipe or insert, is screwed into the bore of a hose in order to support the hose against collapse by the pressure exerted on the exterior of the hose by the shell or body, the insert being continuously threaded throughout the major portion thereof disposed within the bore of the hose. The insert also makes sealing engagement with the bore of the hose and may be provided with means at its projecting end for connection to another fluid conduit or the like. A very satisfactory coupling of this general type is disclosed in the copending application of Joseph Norman Paquin, Serial No. 484,731, filed April 27, 1943, now Patent No. 2,420,617, granted May 13, 1947. The present invention is described in conjunction with couplings of the type described and claimed in said Paquin application, and in some respects the present invention may be considered as an improvement thereon.

It is desirable to construct hose couplings or fittings of the quick attachable type, so that they can be secured to the ends of non-metallic hoses by ordinary hand tools and with a minimum of effort. The couplings should not substantially restrict the fluid passageway, and it is also important that there be a strong mechanical connection between the ends of the hose and the coupling. Obviously there should be a permanently leak-proof connection between the hose insert and the internal bore of the hose, and the parts should be such that the hose will not be damaged by the coupling either during the operation of securing the coupling to the hose or thereafter in service. It is a general object of the present invention to provide a hose coupling in which these desired characteristics are attained to a greater degree than heretofore possible. More specifically, it is an object of the present invention to provide a hose insert whereby the foregoing advantageous characteristics may be attained in hose couplings of the quick attachable or other types.

The difficulties noted above, particularly with reference to ease of assembly and the production of a leak-proof connection between the insert and the bore of the hose, are present to a particularly great extent in hose couplings utilized with high pressure hoses such as hoses of natural or synthetic rubber reinforced with wire braid, and particularly with such hoses composed of present-day synthetic materials. The presence of the wire reinforcement in the body of the hose increases the difficulty of inserting the nipple or insert into the bore of the hose, for expansion of the bore of the hose is resisted by the wire reinforcement. Furthermore, the synthetic materials are especially subject to what is known as "cold flow." That is, after a conventional hose coupling is assembled on a hose, with the material of the hose compressed firmly into sealing engagement with the exterior surface of the insert by the outer body or sleeve, the material of the hose may in time flow away from the zone of greatest compression like an extremely viscous fluid, and thus the sealing pressure between the exterior of the nipple and the bore of the hose may be gradually reduced, resulting in the inability of the hose coupling to withstand the intended pressure. Thus with prior couplings, and particularly with wire braid reinforced hoses, it is difficult to obtain the required initial sealing pressures to enable the connections to withstand high pressures, and furthermore, the nature of the materials employed is such that the couplings have gradually lost their ability to withstand high pressures. Another object of the present invention is to provide a hose coupling, or more specifically an insert for a hose coupling, whereby adequate sealing pressures can be obtained between the insert and the bore of the hose and whereby cold flow of the material of the hose tending to reduce the sealing pressures is substantially eliminated.

Figure 2:
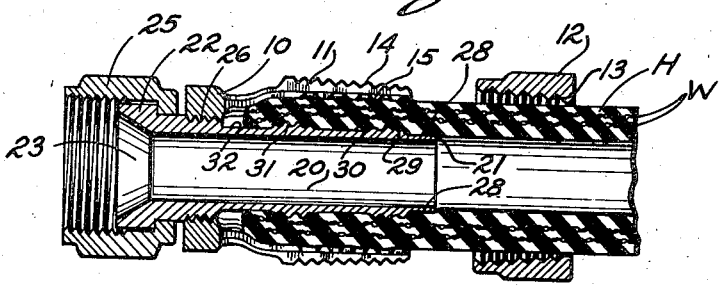
Figure 3:
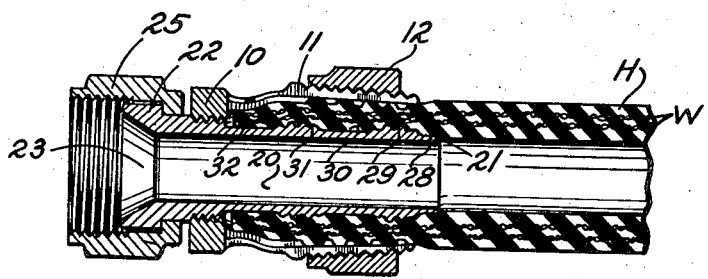
Figure 4:
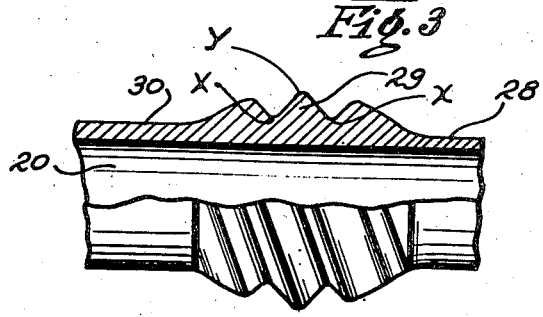

In the drawings in which I have illustrated a preferred form of my invention, Figure 1 is a view partly in section showing a coupling embodying my invention before it has been secured to a hose; Figure 2 is a sectional view showing the assembly of hose and coupling at an intermediate stage in the assembling operation; Figure 3 is a similar view showing the completed assembly of hose and coupling; and Figure 4 is a fragmentary view partly in section, on a considerably enlarged scale, illustrating a portion of the nipple or insert embodying my invention.

As noted above, my invention is described and shown herein as it may be applied to a coupling of the general type disclosed and claimed in the aforesaid Paquin application, Serial No. 484,731. Such a coupling comprises a body portion which as shown in Figures 2 and 3 receives the end of the hose H, composed of rubber (either natural or synthetic) and shown herein as having wire braid reinforcements W, although it is to be understood that the invention is useful in connection with hoses of other types and materials. The body portion is provided with a plurality of fingers 11 which extend coaxially of the hose and are deformed to compress the material of the hose by means of the nut 12, having tapered threads 13 adapted to engage the tapered threads 14 on the exterior of the fingers 11. The fingers are interiorly threaded as at 15 so that the hose may be screwed into the body portion and in order to make a secure and strong mechanical connection between the body portion, and the hose when the fingers are deformed into clamping engagement with the body portion by the nut 12.

In order to prevent the bore of the hose from being collapsed by the compression pressures exerted by the body portion and to provide a means for connecting the bore of the hose to another fluid conduit or the like, the nipple 20 is provided. The inner end of the nipple preferably extends into the bore of the hose beyond the ends of the fingers 11 as indicated at 21, while the other end of the nipple is provided with means for connection to another instrumentality such as the enlarged end 22 which may be provided with a conical sealing surface 23 and which furnishes a shoulder 24 for retaining the coupling nut 25 on the insert. The insert is threaded into the body 10 preferably with a left hand thread as at 26, and then staked, or otherwise suitably formed to join it securely to the body portion 10.

Fittings of this type are assembled by screwing the hose into the body portion 10 while the fingers 11 are in their outward position and before they are compressed or deflected together by the nut 12. The insert 20 is screwed simultaneously into the bore of the hose. In other words, the hose end is screwed into the annular space between the exterior of the nipple and the interior surfaces of the several fingers 11. In order to avoid restricting the flow of fluid through the coupling, the interior diameter of the insert is preferably nearly as large as the diameter of the bore of the hose. Thus the bore of the hose must be expanded in order to receive the insert 20. Heretofore, and as illustrated in the aforesaid Paquin application, it has been the practice to provide such inserts with threads throughout the entire zone of greatest compression, the entering end of the inserts being free from threads for a short distance to facilitate entry into the hose. However, it has been considered essential heretofore to thread the inserts substantially as shown in the aforesaid Paquin application in order to obtain a sufficient grip between the inserts and the hoses and also to make it possible to screw the inserts into the hoses.

Contrary to the teachings of the art, I have found that superior results can be obtained, if instead of extending the threads throughout the major portion of the nipple, relatively short, spaced threaded portions are employed. Thus I preferably provide a nipple, as shown best in Figure 1, having an entering part 28 of a diameter only slightly greater than the bore of the hose. Then I provide a threaded portion 29 of enlarged diameter and of about the same longitudinal extent as the entering portion 28. Next I provide a central sealing portion 30 of slightly greater diameter than the entering part 28, but preferably not greater than the root diameter of the threads of the portion 29. The length of the portion 30 is preferably at least equal to the thickness of the wall of the hose. The portion 30 is followed by another threaded portion 31 similar to the threaded portion 29, and then I preferably provide a secondary sealing portion 32 of the same diameter as the portion 30 and extending between the second threaded portion 31 and the point of juncture of the insert with the body 10.

Preferably the threaded portions 29 and 31 are formed substantially as shown on an enlarged scale in Figure 4. The pitch of the threads is such that they will advance the hose at the same rate as the internal threads 15. The threads 31 are rounded at top and bottom, and the faces of the threads are at 90° to each other. Preferably a double thread is employed, for example, with a hose having a bore of about ⅝ inch, I may employ a 16 pitch double lead thread, the depth of the threads being about .024 inch, the root diameter of the threads being about .025 inch greater than the diameter of the interior bore of the hose with which it is to be used. Preferably, after the threads are cut the threaded portions are machined to an arcuate profile as shown, the arcuate shape making it easier to insert the nipple into the hose, and insuring that the hose will conform to the insert without being subjected to excessive bending or other strains adjacent the threaded portions.

With such an arrangement, the insert can be screwed readily into the bore of the hose. The threaded portions 29 and 31 are sufficient to insure proper gripping engagement between the insert and the bore of the hose, while the smooth portions of the hose reduce the torque required to insert the nipple into the hose by reducing the frictional engagement between the exterior of the nipple and the bore of the hose. Furthermore, the elimination of the threads from the cylindrical sealing surface 30 makes possible the production of a better seal adapted to withstand higher pressure without requiring the body of the hose to be subjected to such great compressive forces. Apparently with an insert which is threaded throughout the zone of greatest compression, the body of the hose must be subjected to sufficient compression to provide sealing pressures sufficient to withstand the pressure of the fluid within the hose even at the roots of the threads; i. e., even at points such as indicated at $x$ in Figure 4. In order to secure the required high sealing pressures at the bases of the threads, excessively high pressures are necessarily developed at the peaks of the threads; i. e., at points corresponding to the points marked $y$ in Figure 4, for it was necessary to apply sufficient pressure to cause the material of the hose to flow into the threads to engage the root portions with the required high sealing pressures. Otherwise, fluid could find its way along the continuous grooves at the bottoms of the threads from the interior of the bore of the hose to the exterior of the fitting. These excessive pressures frequently result in the flow of the material of the hose away from the zones of the greatest pressure and ultimate inability of the connection to withstand the intended pressure without leakage.

With the present construction, on the other hand, the presence of the sealing surface 30, which is smooth and substantially cylindrical throughout and which is of substantial longitudinal extent, eliminates the need for excessively high compression pressures. Thus, it is only necessary to compress the body of the hose sufficiently to insure sufficient sealing pressure in the zone of the sealing surface 30. There is no necessity to cause the material of the hose to flow into the threads of the threaded portions 29 and 31, for leakage through either of these portions would be immaterial. Accordingly, the threads can be designed with a view to obtaining the best possible mechanical connection between the insert and the bore of the hose and the greatest ease of inserting the insert into the bore of the hose and without regard to their characteristics insofar as sealing is concerned.

Furthermore, the spaced threaded portions 29 and 31 function to trap the material of the body of the hose between them and to prevent substantial cold flow of material in service. It will be evident that the unit pressures in the body of the hose will be greater in the annular zones surrounding the threaded portions 29 and 31 than in the zone surrounding the sealing portion 30. Yet the arrangement is such that when the nut 12 is screwed onto the fingers 11 to clamp the hose against the insert, sufficient sealing pressure is developed against the sealing surface 30 to withstand the hydraulic pressure within the line. The zone surrounding the sealing surface 30 is disposed between two zones of higher unit pressure. With this arrangement there can be no substantial loss of pressure of the material of the hose against the sealing surface 30, for the zones of higher pressure surrounding portions 29 and 31 substantially eliminate cold flow of material away from the zone surrounding the sealing surface 30. By this construction, it is therefore possible to provide hose couplings in which the effective sealing qualities of the coupling are not substantially reduced by cold flow of materials with age and under severe conditions. Furthermore the configuration and arrangement of the insert is such that there is no substantial likelihood of damage to the material of the hose as the hose is assembled with the coupling, the coupling may be assembled with the hose without requiring excessive force, and high pressure seals can be obtained without requiring great enlargement of the bore of the hose so that the couplings may be used satisfactorily for high pressure installations embodying hoses reinforced with wire braid.

While I have described a preferred form of invention as adapted to couplings of one particular type, those skilled in the art will appreciate that the invention may be adapted to other types of couplings, and that various changes and modifications may be made in the invention without departing from the spirit and scope thereof. It is therefore to be understood that my patent is not limited to the preferred form of the invention described herein or in any manner other than by the scope of the appended claims.

I claim:

1. A hose end fitting comprising a body within which a hose end is received and gripped, and a tubular insert for supporting the hose against the pressure exerted on the exterior of the hose by said body, said insert being in sealing engagement with the bore of the hose, the portion of the insert within the hose comprising two spaced arcuate threaded portions having double lead, substantially 90° threads thereon, and a substantially cylindrical sealing portion between said threaded portions and in a zone wherein said body exerts substantial pressure on the exterior of the hose tightly to clamp said hose against said cylindrical portion to provide a tight seal and simultaneously to clamp said hose at said threaded portions to prevent cold flow of material forcing said hose endwise in either direction away from said cylindrical portion.

2. A hose fitting comprising a body having a plurality of projecting internally and externally threaded fingers within which a hose end is received and gripped, a nut with a tapered internal thread cooperating with said fingers to apply a gripping pressure to the hose end greater at the ends of said fingers than adjacent said body, and a tubular insert for supporting the hose against the gripping pressure exerted on the exterior of said hose by said fingers, said insert being in sealing engagement with the bore of the hose, the portion of the insert within the hose comprising two spaced arcuate threaded portions and a substantially cylindrical sealing portion between said threaded portions, said fingers compressing the hose against said sealing portion and said threaded portions of said insert.

3. A hose fitting comprising a body having a plurality of projecting externally threaded fingers with a greater radial separation at their mid length than at the points at which they merge with said body, a tubular insert to support against compression, a soft hose thereon and forced between said insert and along said fingers to the body adjacent parts of said fingers and then compressed thereby, the external portion of said insert having thereon two spaced arcuate threaded portions, positioned lengthwise one near the middle of said fingers and the other adjacent the free end thereof and a nut with a tapered internal thread cooperating with the threads on said fingers to apply a gripping pressure to a soft hose with a greater compressive force at the ends of said fingers than adjacent the mid length whereby said hose external diameter is greater at said mid length of said fingers than at either end thereof to be tightly compressed over said threaded portion adjacent the free ends of said fingers and less tightly compressed at said other threaded portion.

HAROLD J. KNAGGS.

REFERENCES CITED

The following references are of record in the file of this patent:

UNITED STATES PATENTS

| Number | Name | Date |
| --- | --- | --- |
| 1,233,401 | Reeve | July 17, 1917 |
| 2,005,613 | Davis et al. | June 18, 1935 |
| 2,333,350 | Weatherhead | Nov. 2, 1943 |
| 2,343,235 | Bashark | Feb. 29, 1944 |